United States Patent [19]

Kober et al.

[11] Patent Number: 4,664,402
[45] Date of Patent: May 12, 1987

[54] COUPLING LINK BETWEEN A TOWING VEHICLE AND A TRAILER, PREFERABLY A TWO-WHEELED TRAILER

[75] Inventors: Kurt Kober, Kötz; Rudolf Wöhrle, Ichenhausen-Rieden; Robert Köhler, Burtenbach, all of Fed. Rep. of Germany

[73] Assignee: Alois Kober KG, Kotz, Fed. Rep. of Germany

[21] Appl. No.: 705,390

[22] PCT Filed: Jul. 11, 1984

[86] PCT No.: PCT/EP84/00212
§ 371 Date: Feb. 15, 1985
§ 102(e) Date: Feb. 15, 1985

[87] PCT Pub. No.: WO85/00562
PCT Pub. Date: Feb. 14, 1985

[30] Foreign Application Priority Data

Jul. 21, 1983 [DE] Fed. Rep. of Germany ....... 3326333
May 21, 1984 [DE] Fed. Rep. of Germany ....... 3418927

[51] Int. Cl.⁴ ............................ B60D 1/14; B60D 1/06
[52] U.S. Cl. ............................... 280/446 B; 280/460 R
[58] Field of Search ............... 280/446 R, 460 A, 447, 280/456 A, 456 R, 446 B, 460 R, 511, 512, 459, 474

[56] References Cited

U.S. PATENT DOCUMENTS

| | | | |
|---|---|---|---|
| 1,636,295 | 7/1927 | Dempsey | 280/513 |
| 1,785,124 | 12/1930 | Jett | 280/33.4 |
| 2,125,479 | 8/1938 | Zagelmeyer | 280/33.15 |
| 2,444,944 | 7/1948 | Minter | 280/456 R |
| 3,787,068 | 1/1974 | Miller | 280/446 R |
| 4,019,754 | 4/1977 | Hinkley | 280/456 R |
| 4,076,264 | 2/1978 | Chatterley | 280/81 A |
| 4,106,794 | 8/1978 | Sallis | 280/456 R |
| 4,248,451 | 2/1981 | Usinger | 280/490 R |
| 4,305,602 | 12/1981 | Ungvari | 280/460 R |
| 4,502,561 | 3/1985 | Kober | 280/446 B |

FOREIGN PATENT DOCUMENTS

| | | | |
|---|---|---|---|
| 6910947 | 3/1969 | Fed. Rep. of Germany . | |
| 1780688 | 8/1974 | Fed. Rep. of Germany | 280/512 |
| 3149700 | 7/1982 | Fed. Rep. of Germany | 280/446 B |
| 3140322 | 1/1983 | Fed. Rep. of Germany . | |
| 537092 | 6/1941 | United Kingdom | 280/460 R |

*Primary Examiner*—John J. Love
*Assistant Examiner*—Charles R. Watts
*Attorney, Agent, or Firm*—Karl F. Ross; Herbert Dubno

[57] ABSTRACT

In the disclosure document DE-OS No. 31 49 700 the theory is put forward that the effective point of attachment of a trailer opposite the towing vehicle can be transferred in the direction of the center of gravity of the towing vehicle. The invention concerns itself with the actual possibility of the transfer while taking structural conditions into consideration. In this respect, the invention shows that at least the joints located at the trailer are to be arranged at a lower level than the ball head of a normal trailer coupling. The distance in height should be considerable, for instance approximately 75 mm. The front joints are located at a cross member, said joints being pivoted around a longitudinal axis in a coupling housing which is fixed rigidly at the ball head of the trailer coupling and thus is immovable.

13 Claims, 9 Drawing Figures

4,664,402

COUPLING LINK BETWEEN A TOWING VEHICLE AND A TRAILER, PREFERABLY A TWO-WHEELED TRAILER

CROSS REFERENCE TO RELATED APPLICATIONS

This application is a National Phase application corresponding to PCT/EP84/00212 based, in turn, upon German National application P No. 33 26 333.7 filed July 21, 1983 and P No. 34 18 927.0 filed May 21, 1984 under 35 USC 119 and the International Convention.

FIELD OF THE INVENTION

The invention relates to a coupling link between a towing vehicle and a trailer, preferably a two-wheeled trailer, having an arrangement for transferring the effective point of attachment in the direction of the center of gravity of the towing vehicle. The coupling link consists of two curved or angular steering arms, which are arranged on both sides of the longitudinal axis of the trailer, and link the towing vehicle with the trailer, and also form a four-bar linkage whose joints, which are allocated to the towing vehicle, are arranged at a shorter distance from one another than those allocated to the trailer.

BACKGROUND OF THE INVENTION

This type of coupling link is described in German patent document No. 31 49 700.

According to this document, it is known that the effective point of attachment of a coupling link between towing vehicle and trailer can be transferred from the normal flank position at the towing vehicle in the direction of the center of gravity of said towing vehicle. This can be achieved by means of angular steering arms, which, on the one hand, are pivoted at the towing vehicle and, on the other hand, at the trailer, with varying distances from one another, thus replacing the generally used towing fork. The fulcrum points at the towing vehicle lie in closer proximity to one another than those at the trailer. In theory, this permits the possibility of steering the towing vehicle opposite the longitudinal axis of the trailer up to a 60° angle, and the pitching motion occurring with the towing vehicle and trailer can, therefore, be reduced considerably.

There are, nevertheless, a number of problems with this design, especially with respect to the strength requirements, which have proved to be necessary for standard tests, vehicle registration inspections and road behavior when the vehicle is in turning position.

OBJECT OF THE INVENTION

It is, therefore, the object of the invention to further develop the above-mentioned coupling link to the extent that the coupling link can also be used practically for turns in excess of 60° without impairing the road behavior and independent of the rear design of the vehicles with which is may be used.

SUMMARY OF THE INVENTION

According to the invention, the joints allocated to the trailer are arranged at a lower level than the ball head of the trailer coupling located at the towing vehicle.

The joints in accordance with the invention have the advantage that the towing vehicle along the longitudinal axis of the trailer can actually be turned by 90°. Here, the invention takes advantage of the fact that the rear section of the towing vehicle is developed diagonally to the center of gravity of said towing vehicle. Thus, by transferring the joints attached to the trailer to a considerably lower level opposite the ball head of the trailer coupling, one succeeds in effectively increasing the degree of steering between towing vehicle and trailer, without risking that the joints of the coupling link knock against the rear of the towing vehicle.

The theory of the principal claim is feasible with a variety of methods. In a construction in which the steering arms in the vertical plane are swan neck-shaped and have, at the trailer, angular lugs that run in the direction of the longitudinal axis of the trailer so as to form the joints allocated to the trailer. The steering arms are so curved that only the joints at the trailer are arranged at a lower level. When the joints allocated to the towing vehicle are also arranged at a lower level than the ball head, all steering arms are arranged at a lower level opposite the ball head of the towing vehicle, the advantage is given of a simplified design of the steering arms.

According to another aspect of the invention, a coupling link between a towing vehicle and a trailer, preferably a two-wheeled trailer, has an arrangement for transferring the effective point of attachment in the direction of the center of gravity of the towing vehicle, which comprises two curved or angular steering arms, which are arranged on both sides of the longitudinal axis of the trailer, link the towing vehicle with the trailer, as well as form a four-bar linkage whose joints, which are allocated to the towing vehicle, are arranged at a shorter distance to each other than those allocated to the trailer. The joins allocated to the towing vehicle are arranged at a cross member which is pivoted within a housing that can be rigidly connected with a ball head of a normal trailer coupling, around a horizontal longitudinal axis of the towing vehicle and trailer. All joints are placed at a lower level to offer the considerable advantage that the coupling link according to the invention can be coupled with the flick of a wrist to the usual trailer coupling of the towing vehicle, thus providing a particularly robust design.

It is true that this principle has already been disclosed in FIG. 7 through 10 of DE-OS No. 31 49 700, but its structural design is too unstable and, above all, has the disadvantage that the pitching motion between towing vehicle and trailer is blocked with a very large degree of steering exceeding 60°.

The invention eliminates all these problems, for it not only permits a wider degree of steering, but also a pitching motion between towing vehicle and trailer even with an extreme degree of steering of, e.g., 90°, because the cross member accommodating the front joints is pivoted around a horizontal axis in a coupling housing. Also, in spite of this extreme steering position opposite the towing vehicle, the trailer can twist, i.e., due to the ball joint motion at the joints facing the towing vehicle, which, at a 90° of steering in relation to the longitudinal axis of the trailer, are positioned in sequence.

A particularly robust and reliable, rigid coupling housing that can be attached to the trailer coupling of the towing vehicle is possible in accordance with the following features of the invention:

Advantageously, the housing accommodating the cross member has a cap-shaped housing section encompassing the ball head as well as two cheeks extending downward from said ball head, which, together with a corresponding wedge-shaped recess opening toward the bottom, is guided to a pin that passes through the coupling neck of the trailer coupling underneath the ball head, while a tension lever, which grips underneath the pin is pivoted at the housing.

The coupling neck of the trailer coupling han have a bearing for the pin, the said pin having been developed as a boss of lug.

The boss can be provided with a bore, which is tapered conically from both outer exteriors toward the center, for accommodating suitable conical pins whose cylindrical projection projects across the boss.

The cylindrical projection can have a wedge-shaped surface which is tapered laterally toward the top.

The tensioning lever can be arranged and lodged with a fork-shaped section in the housing and conducted to the outside through a recess in the housing wall by means of a single-arm lever section connected to said tensioning lever.

The joints facing the towing vehicle, the bearing axis of the cross member and the pin penetrating the coupling neck can be positioned on a common horizontal plane.

BRIEF DESCRIPTION OF THE DRAWING

Further details of the invention are illustrated schematically and by examples in the accompanying drawings. Of the drawings.

SPECIFIC DESCRIPTION

Figure 1:
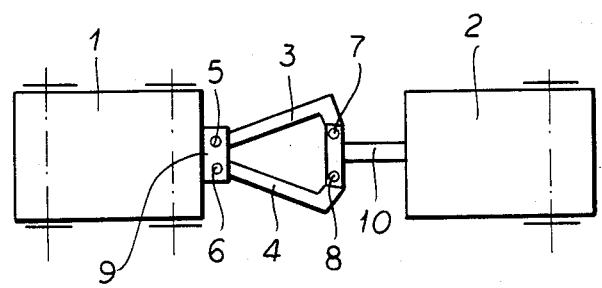
FIG. 1: shows a schematic top view of a team consisting of towing vehicle, coupling link and trailer.

The above-mentioned team forms the basis of this invention, whose towing vehicle is designated 1 and whose trailer is designated 2. According to the invention, the coupling link between said towing vehicle and trailer is brought about by steering arms 3,4 provided with joints 5 through 8. The distance of the joints 5,6 is smaller than that of the joints 7 and 8. This results in the effective point of attachment being transferred in the direction of the center of gravity of the towing vehicle 1.

The joints 5,6 may be arranged at a bridge 9 of the towing vehicle 1 and the joints 7,8 at a swiveling axis 10 of the trailer 2.

The invention includes all possibilities referred to in the state of the art, particularly those mentioned in disclosure document DE-OS No. 31 49 700.

Figure 2:
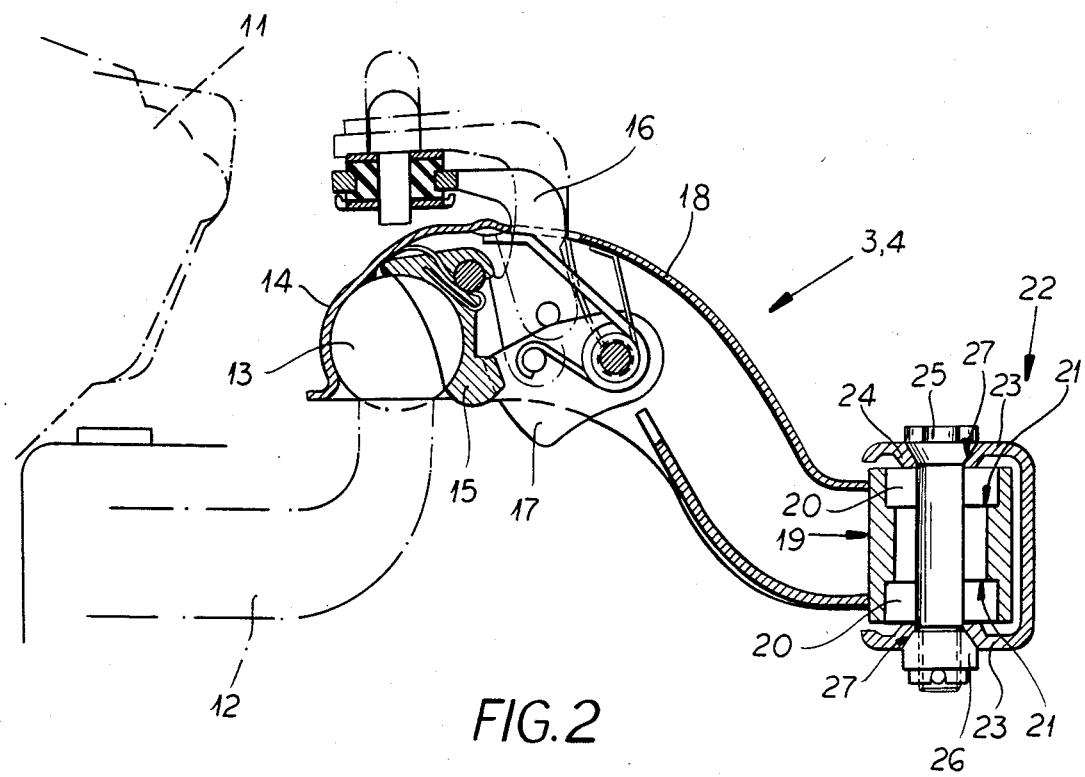
FIG. 2: shows a vertical section of a steering arm of the coupling link in accordance with one embodiment.

The embodiment in FIG. 2 shows the longitudinal section through the rear 11 of a towing vehicle and through a steering arm 3,4 (alongside its curved longitudinal axis). A trailer coupling of the towing vehicle is designated 12, which is provided with a ball head 13.

With the object illustrated in FIG. 2, the ball head 13 can either be coupled with the bridge shown in FIG. 1 or with an individual steering arm 3,4. As is common with conventional coupling links, the ball head 13 admits the tensioning cap 15 which is movable via a tensioning lever 16 by means of a tensioning link 17. Here it is a question of using known three-dimensional shapes.

As distinguished from the state of the art, the individual steering arm 3,4 has a swan neck-shaped curve 18 which leads to a lug 19, said lug being so arranged that it projects in the direction of the longitudinal middle plane of the team. This lug 19 has two buffers 21 bordered by the outer rings of helical ring grooved bearings 20.

The individual lug 19 is encompassed by a fork-shaped receiver 22 (of the swiveling axis 10—cif. FIG. 1). This receiver 22 has two arms 23 surrounding the lug 19, in which are located vertical bores for accommodating the locking screws 25 or locking nuts 26. The edge 24 of the bore is collar-shaped toward the inside and matches the conical projections 27 of the locking screws 25 or locking nuts 26. When bolting the locking elements 25 and 26, the collar-shaped edge 24 of the bore is braced against the inner rings of the bearings 20, whose outer rings are supported at the buffers 21.

Thus, a proper bearing application and centering, as well as bracing of the steering arms 3,4 can be achieved at the trailer by the simplest means, while the prerequisite has been created to skew the steering arms 3,4 and to adapt them suitably for the purpose of solving the problem in question.

In actual practice, it is recommended to set the central horizontal plane, which, according to FIG. 2, runs through the lug 19, approximately 75 mm lower than the horizontal plane running through the ball head 13. This is considered an average dimension which, as a function of the structural conditions of the vehicle and trailer team, can be varied considerably.

It has also proved to be practical to extend the distance of the joints 5,6, which are allocated to the towing vehicle, from the rear 11 of the towing vehicle 1 to conventional couplings, e.g., by approximately 30%. Contingent upon structural conditions, this percentage can be varied considerably.

However, a deciding factor for any dimensioning is the establishment of the optimal position of the fulcrum points 5 through 8, so as to enable a maximum degree of steering in view of the contours of the towing vehicle and trailer.

In the second embodiment in accordance with FIGS. 3 through 7, one starts out from the basis that—unlike in FIG. 2—all joints 5,6,7,8 are positioned at a lower level than the ball head 13. In a preferred embodiment, the longitudinal axis 29 illustrated in FIG. 3, which runs through the center of the joint 5,6 facing the towing vehicle, is located approximately 70 mm underneath the axis of ball head 13.

Figure 3:
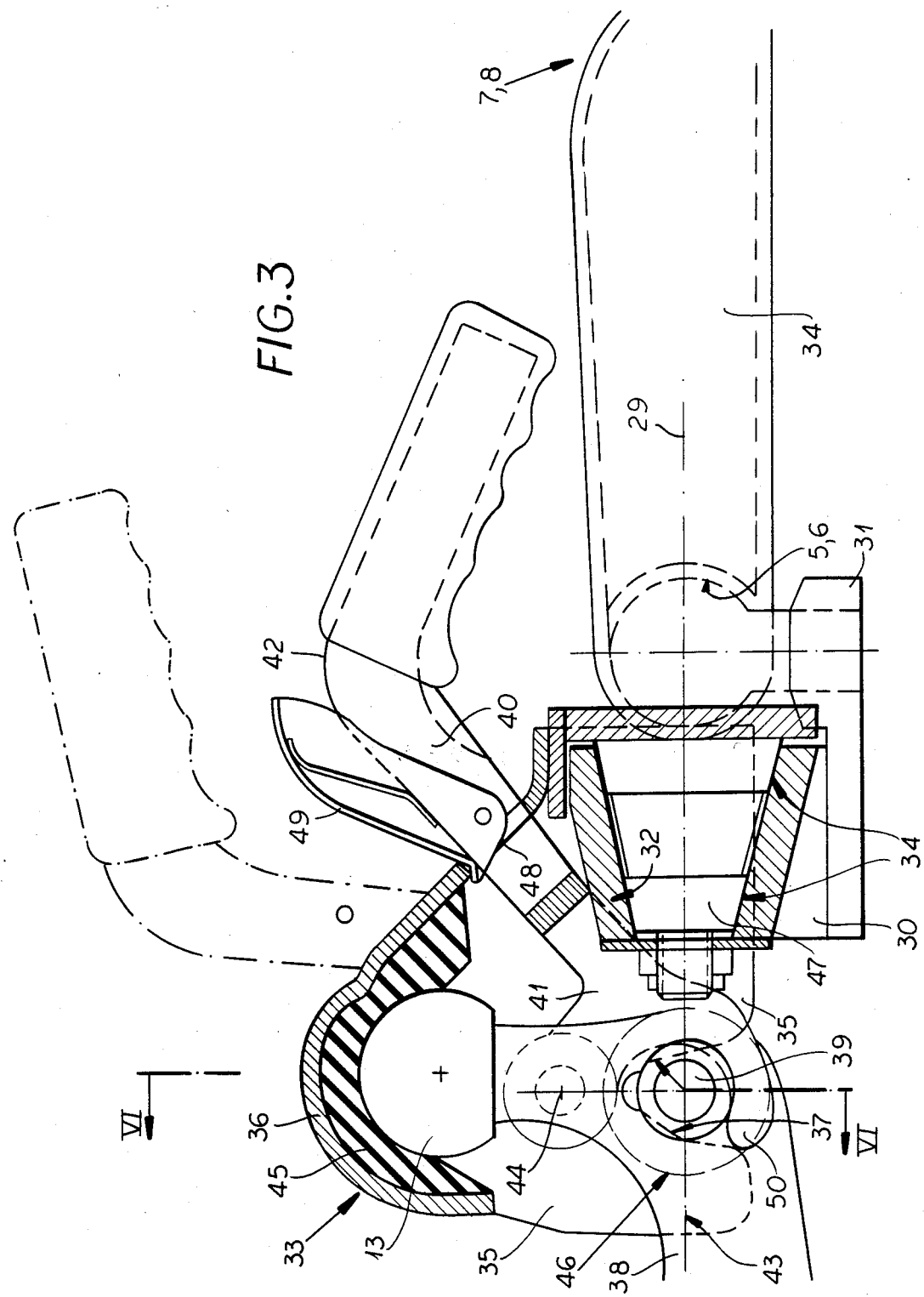
FIG. 3: shows a side view, in part with a vertical section, of a coupling link in accordance with a second embodiment.

In the right hand section of FIG. 3, the joints 7,8 located at the steering arms 3,4 are merely indicated.

The positioning of all joints 5 through 8 at a lower level has the advantage that the two front joints 5,6 can be arranged in a cross member 28 which is pivoted around said longitudinal axis 29 in a housing 33 of the coupling. This coupling housing 33 is designated to be secured at the normal ball head 13 of a common trailer coupling of the towing vehicle.

Figure 4:
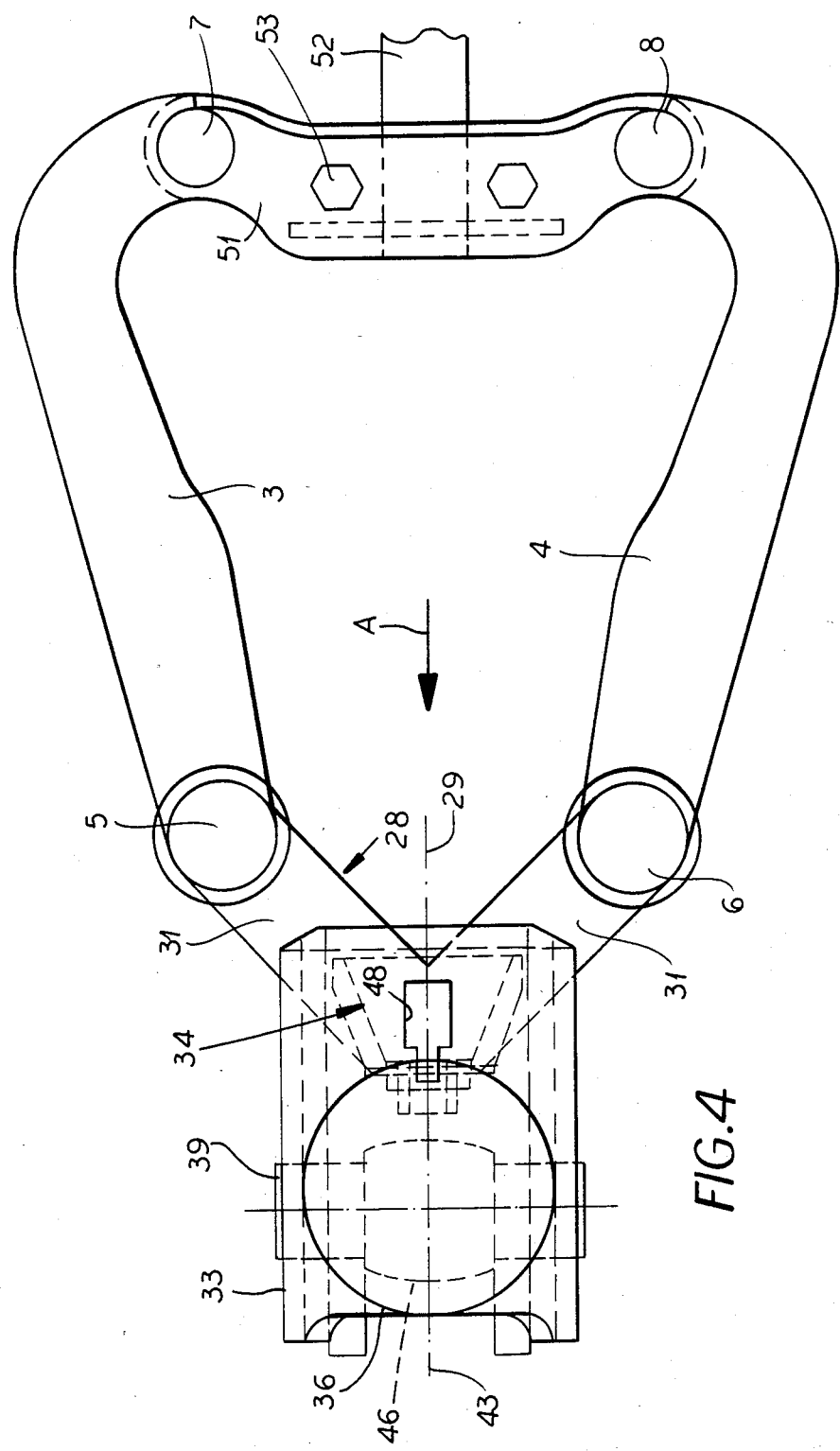
FIG. 4: shows a top view of the coupling link in accordance with FIG. 3, with the vehicle in straight driving position.
Figure 5:
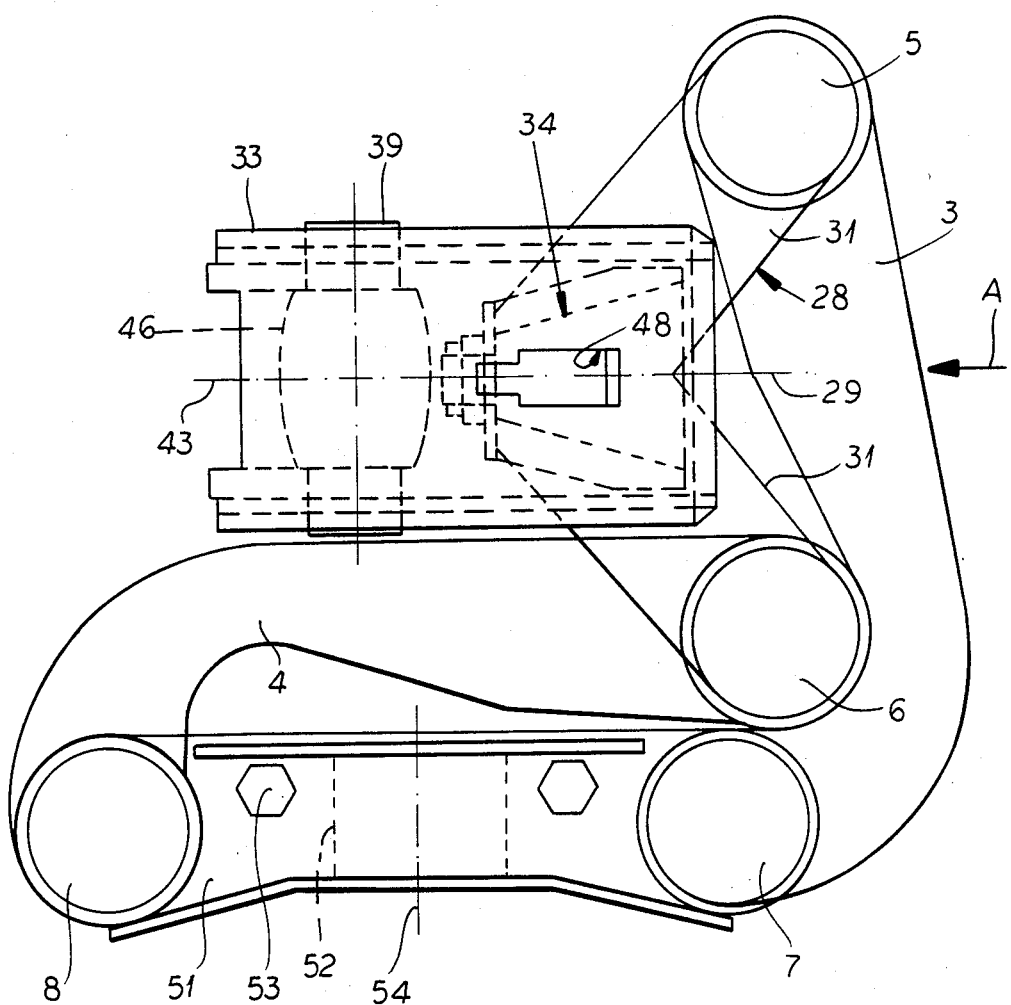
FIG. 5: shows a top view in accordance with FIG. 4 in a 90° steering position.

As is clearly illustrated in FIG. 4, the cross member 28 is provided with arrow-shaped arms 31 extending in the direction of the trailer 2, at both ends of which the two joints 5,6 are attached. These arms 31 start from the lower edge of an upright middle section 30 of the cross member 28. This upright middle section 30 contains a conical bearing sleeve 32 which, together with a cone journal 47, forms a cone bearing 34. The cone journal 47 is a component of the coupling housing 33.

It is the purpose of this cone bearing that the joints 5,6 of the cross member 28 can perform a swiveling motion around the longitunial axis 29, which, at the same time, is the central bearing axis of the cone bearing 34, said swiveling motion being necessary to enable the trailer opposite the towing vehicle to twist around the longitudinal axis of the team.

This arrangement offers, at the same time, the advantage that the steering arms 3,4 with the their joints 5 through 8 form a preassembled compact unit that is pivoted in the coupling housing 33, so that the entire arrangement, as is illustrated in FIGS. 3 & 4, can be secured—as usual—with a single tensioning lever 40 at the ball head 13 of a conventional trailer coupling of the towing vehicle.

The coupling housing 33 has a cap-shaped housing section 36 which has been so designed that the cap—as usual—can be attached from above to the ball head 13. At the inside of the cap-shaped housing section 36, an elastic pad 45 is located, which is made mainly of rubber or similar material.

Figure 6:
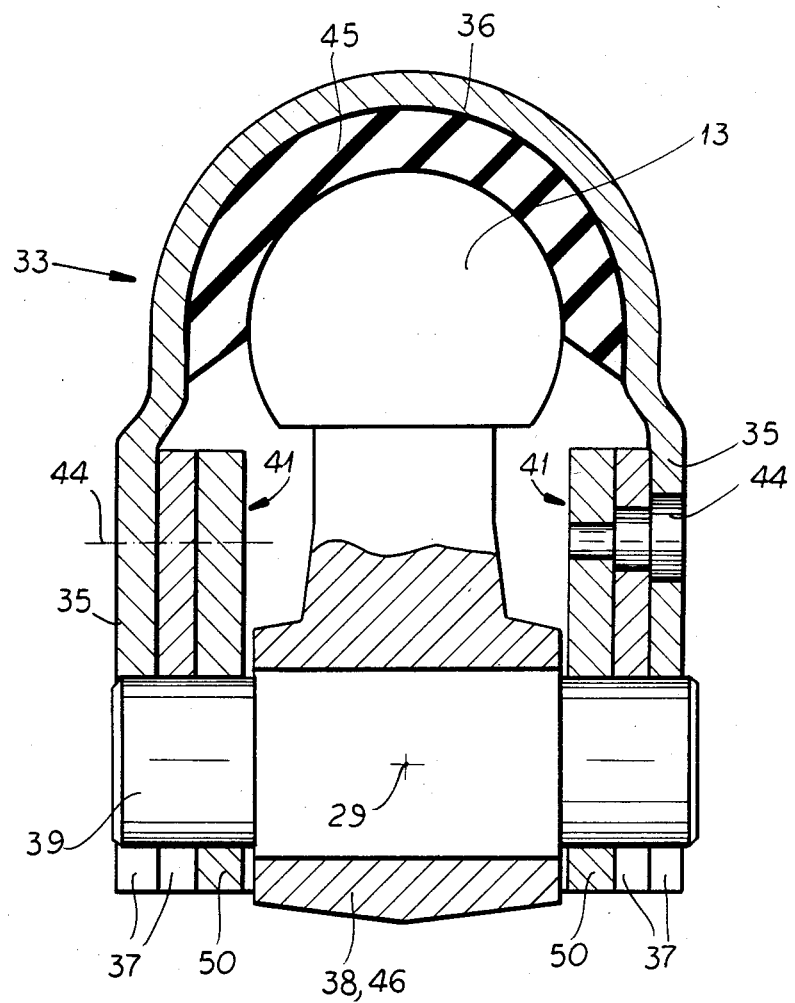
FIG. 6: shows a vertical section in accordance with line VI—VI through the coupling housing in accordance with FIG. 3.
Figure 7:
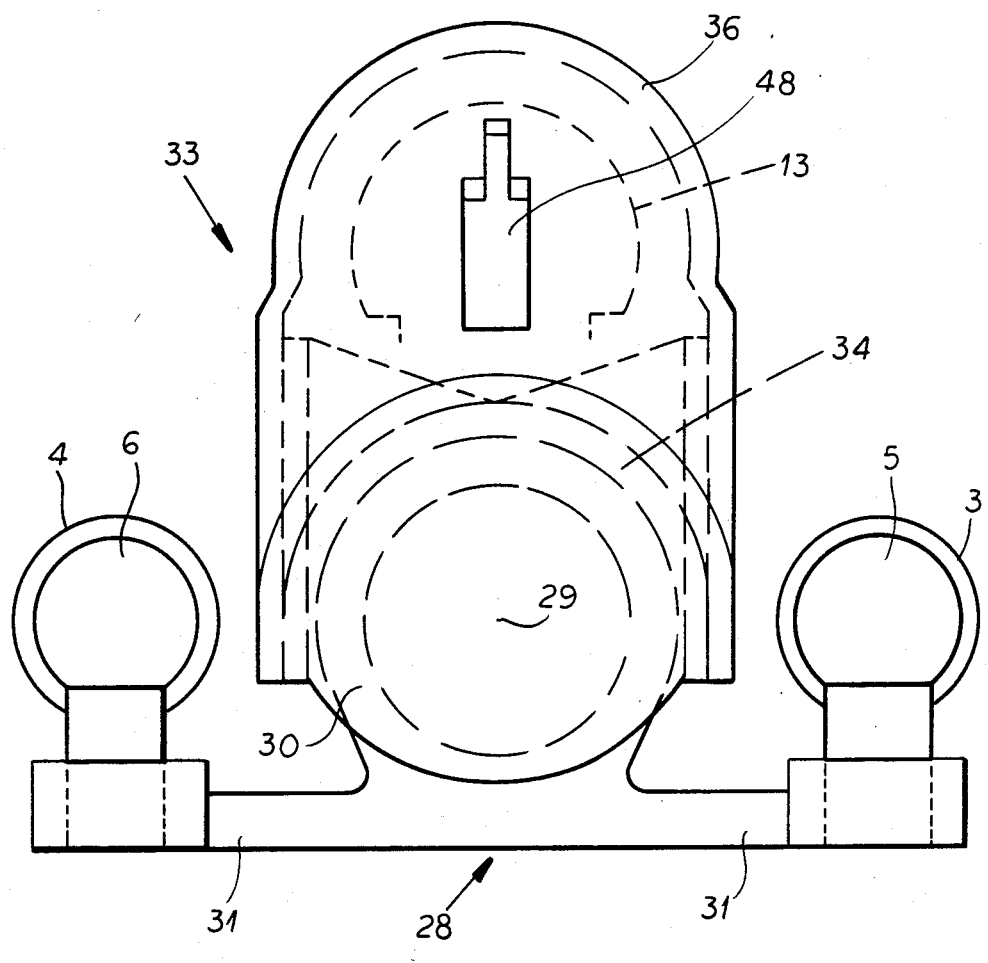
FIG. 7: shows a front view of the coupling link in accordance with arrow A in FIG. 4.

From this cap-shaped housing section 36, two cheeks 35 extend downward, as is clearly illustrated in FIG. 6. These cheeks 35, which are located opposite each other, encompass the coupling neck 38 of the normal trailer coupling. In the bend of this coupling neck 38 is located a pin 39, which penetrates the neck 38 transversely to the longitudinal axis 29 as well as the cheeks 35. These cheeks 35 have wedge-shaped recesses that are open toward the bottom, said recesses being adapted to the diameter of the pin 39. Thus, when attaching the coupling housing 33 to the ball head 13, it is ensured that the coupling housing 33, as a consequence of the pin 39 being secured in the wedge-shaped recesses 37, can no longer be twisted around the vertical axis by the ball head 13. The possibility of being twisted must be completely eliminated, because the angle of steering, as was mentioned in the beginning, is produced via the two steering bars 3,4 and their joints 5 through 8.

In order to secure the coupling housing 33 at the trailer coupling 13,38 and protect it against undesired lift-off, a tensioning lever 40 is pivoted in the bearing pin 44 at the cheeks 35. The tensioning lever 40 and its fork-shaped lever section 41 are located in the coupling housing 33. This fork-shaped section 41 both encompasses the coupling neck 38 and the conical bearing sleeve 32 of the cross member 28. A single-arm lever section 42 extends from the fork-shaped section 41, said lever section penetrating the coupling housing 33 by way of a recess 48. Similarly, the tensioning lever 40 can be provided with a locking mechanism 49 which locks the tensioning lever 40 in tensioning position.

The fork-shaped section 41 encompasses the pin 39 with its tensioning arm 50, which is located underneath the bearing pin 44, said pin having a leading bevel for practical purposes. If the tensioning lever 40 is turned from the position, illustrated by dash-dotted lines, in FIG. 3, to the extended tensioning position, then the tensioning arms 50 brace the tensioning arms 50 of the cap-shaped housing section 35 of the coupling housing 33 opposite the pin 39, for which the elastic pad 45 is used as a flexible connecting member.

The embodiment of FIG. 4 shows the coupling housing 33 with the adjacent cross member 28 in straight drive position of the vehicle and trailer team. The joints 5,6,7,8 are arranged in pairs symmetrically to the longitudinal axis 29. The joints 5,6 are clearly located behind the ball head 13.

The rear joints 7,8 are located in a transverse yoke 51 which is connected via the attachment 53 with the tow bar 52 of the trailer.

The relative torsion of the trailer opposite the towing vehicle around the longitudinal axis 29 is made possible with the coupling link according to the invention at the coupling housing 33 via the cone bearing 34 of the cross member 28. The pitching motions between towing vehicle and trailer, that occurs when driving over undulating ground, are permissible due to the ball-joint-function of the two front joints 5,6.

A different situation presents itself, when the coupling link according to the invention is subjected to a sharp angle of steering. In the example given in FIG. 5, the angle of steering is 90°. It shows that the cross member 28 with the two front joints 5,6 has remained in its normal position, as is shown in FIG. 4, because the cross member 28, which actually is adjusted free from play in the axial direction (in relation to the longitudinal axis 29), only has the degree of freedom of the swiveling motion around the longitudinal axis 29. When turning, the steering arms 3,4 therefore move around the front joints 5,6. It shows that the longitudinal axis 54 of the trailer is at a right angle to the longitudinal axis 29 of the cone bearing 34. Consequently, the rear joints 8 are now arranged parallel to the longitudinal axis 29, while the joint 6 lies adjacent to the joint 7. The design of the steering arms 3,4 is, as is evident, so developed that during a sharp turn the steering arms 3,4 do not collide with the cross member 28 or front links 5,6.

In this turning position, the pitching motion of the trailer opposite the towing vehicle is permitted due to the fact that the coupling link according to the invention is rotatable around the bearing axis 29 of the cone bearing 34. Therefore, the twisting of the trailer opposite the towing vehicle around the longitudinal axis 54 of the trailer is made possible, as is evident, due to the trailer's ability to twist around the connecting line of the front joints 5,6.

Figure 8:
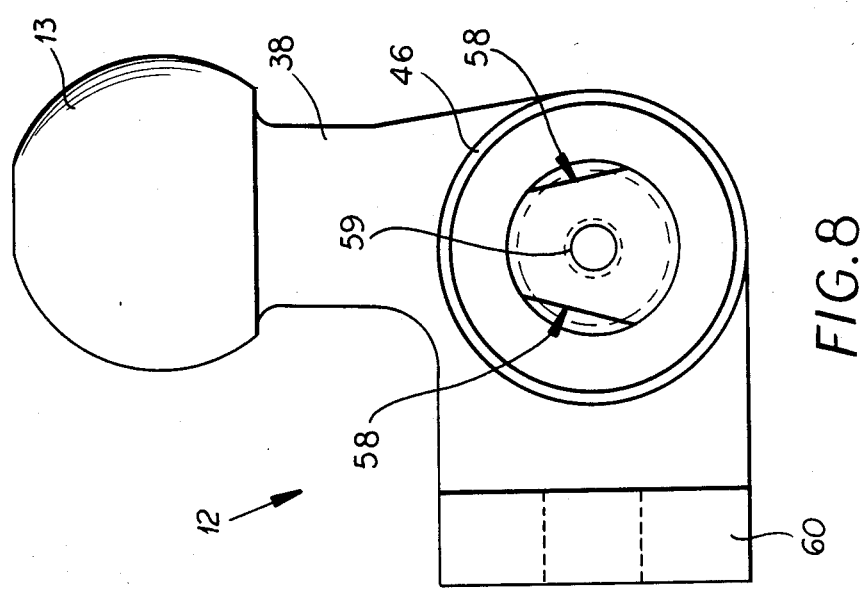

In the embodiment of FIG. 8, the boss 46 of the trailer coupling 12 has a conical bore 55 tapered from the outside toward the inside, into which two conical pins 56 engage. These are braced against each other with the screw 59. The cylindrical projection 57 of each pin 56 extends across the front end of the boss 46, so that the individual projection 57 can be grasped from underneath by the tensioning arm 50 of the tensioning lever 40. Moreover, the projections 57 have wedge-shaped sides 58 that taper toward the top and form a guide for the wedge-shaped recess 37 of the housing 36 (see also FIG. 3).

Figure 9:
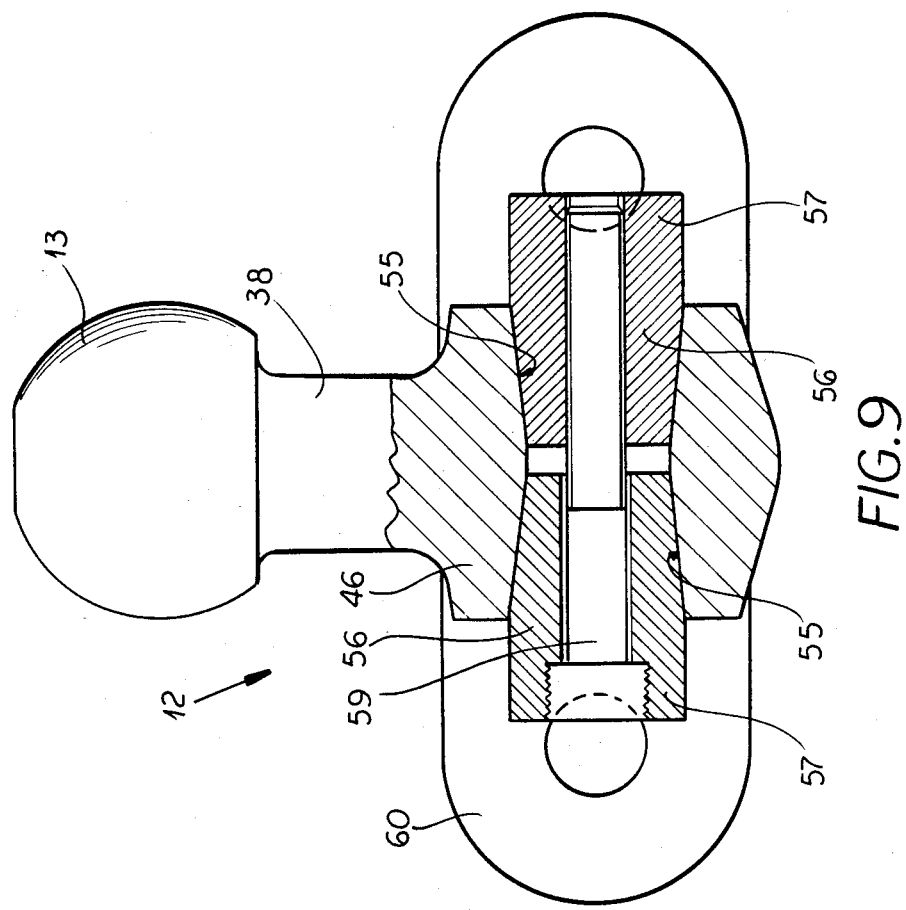
FIGS. 8 & 9: side and top views, in part as a section, of a section of a trailer coupling.

The section of the trailer coupling 12 shown in FIGS. 8 and 9 may also be provided with a flange 60, so as to couple it with a suitable component connected to the towing vehicle.

We claim:

1. A coupling between a towing vehicle and a trailer, comprising:

a trailer hitch on said vehicle formed with a ball-shaped head;

means forming a pair of vehicle pivots at a fixed distance from one another on said vehicle on opposite sides of a vertical median plane through said ball-shaped head;

means forming a pair of trailer pivots on said trailer at a fixed distance from one another on opposite sides of said plane, both of said pairs of pivots being located below said head;

generally L-shaped rigid links on opposite sides of said plane, each respectively pivotally connecting one of said vehicle pivots and one of said trailer pivots, each of said links being angled away from said plane having a relatively long leg and a relatively short leg, the spacing between said vehicle pivots being less than the spacing between said trailer pivots;

a respective ball joint between each of said vehicle pivots and the respective link;

a common traverse supporting said vehicle pivots and formed with a socket for receiving said ball-shaped head and thereby mounting a four-bar linkage formed by said traverse, said pivots and said links on said hitch; and a support for said trailer pivots locating said trailer pivots below said head, said short legs being formed with lugs swingably connecting them to the respective trailer pivot.

2. The coupling defined in claim 1 wherein said pairs of pivots are located at substantially the same level.

3. A coupling between a towing vehicle and a trailer, comprising:

a trailer hitch on said vehicle formed with a ball-shaped head;

means forming a pair of vehicle pivots at a fixed distance from one another on said vehicle on opposite sides of a vertical median plane through said ball-shaped head;

means forming a pair of trailer pivots on said trailer at a fixed distance from one another on opposite sides of said plane;

generally L-shaped rigid links on opposite sides of said plane, each respectively pivotally connecting one of said vehicle pivots and one of said trailer pivots, each of said links being angled away from said plane having a relatively long leg and a relatively short leg, the spacing between said vehicle pivots being less than the spacing between said trailer pivots;

a respective ball joint between each of said vehicle pivots and the respective link;

a common traverse supporting said vehicle pivots and formed with a socket for receiving said ball-shaped head and thereby mounting a four-bar linkage formed by said traverse, said pivots and said links on said hitch; and a support for said trailer pivots locating said trailer pivots below said head, said short legs being formed with lugs swingably connecting them to the respective trailer pivot, each of said lugs being encompassed by a fork-shaped receiver of a drawbar of said trailer forming said support and having an arm provided with vertical bores, having bore edges that are collar-shaped toward the inside and braced by conical projections and screw-threaded locking means against inner rings of a bearing having outer rings supported at buffers of the respective bearing lug.

4. A coupling between a towing vehicle and a trailer comprising:

a trailer hitch on said vehicle formed with a ball-shaped head having a vertical median plane through said head;

means forming a pair of trailer pivots on said trailer at a fixed distance from one another on opposite sides of said plane;

generally L-shaped rigid links on opposite sides of said plane, each respectively connecting one of said vehicle pivots and one of said trailer pivots, said links being angled away from said plane, the spacing between said vehicle pivots being less than the spacing between the trailer pivots;

a common traverse supporting said vehicle pivots and pivoted in a housing which can be rigidly connected with said head whereby said traverse is pivotal about a horizontal longitudinal axis of the towing vehicle and the trailer and forms with said pivots and said links a four-bar linkage.

5. The coupling defined in claim 4 wherein said traverse has two arms which run at an angle from a lower edge of the upright middle section of said traverse in the direction of said trailer and on which ball joints are arranged for connection to the respective lines.

6. The coupling defined in claim 5 wherein said upright middle section has a bearing determining said longitudinal axis.

7. The coupling defined in claim 6 wherein said bearing is a cone bearing.

8. The coupling defined in claim 4 wherein said housing has a cap-shaped housing section encompassing said head and two cheeks extending downwardly from said head and together with a corresponding wedge-shaped recess opening downwardly, being guided to a pin passing through a coupling neck and of said hitch underneath said head, a traction lever gripping beneath that pin being pivoted on said housing.

9. The coupling defined in claim 8 wherein said neck has a bearing for said pin.

10. The coupling defined in claim 9 wherein said pin is provided with a bore tapered conically from opposite ends toward a center and accommodating conical members.

11. The coupling defined in claim 10 wherein said wedge-shaped recess is tapered laterally toward the top.

12. The coupling defined in claim 8 wherein said tensioning lever is arranged in said housing and has a fork-shaped section therein extending to the exterior through a recess in a wall of said housing with a single-arm lever section.

13. The coupling defined in claim 8 wherein said vehicle pivots, said longitudinal axis and said trailer pivots lie in a common horizontal plane.

* * * * *